United States Patent
Koch et al.

(10) Patent No.: US 10,247,276 B2
(45) Date of Patent: Apr. 2, 2019

(54) METHOD FOR CONTROLLING A ROTATION DAMPER FUNCTIONING ACCORDING TO THE GYROSCOPIC PRINCIPLE

(71) Applicants: AUDI AG, Ingolstadt (DE); KARLSRUHER INSTITUT FÜR TECHNOLOGIE, Karlsruhe (DE)

(72) Inventors: Tilo Koch, Ingolstadt (DE); Bastian Scheurich, Bad Wimpfen (DE); Frank Gauterin, Leinsweiler (DE); Michael Frey, Ettlingen (DE)

(73) Assignees: AUDI AG, Ingolstadt (DE); Karlsruher Institut für Technologie, Karlsruhe (DE)

( * ) Notice: Subject to any disclaimer, the term of this patent is extended or adjusted under 35 U.S.C. 154(b) by 0 days.

(21) Appl. No.: 15/543,666

(22) PCT Filed: Dec. 12, 2015

(86) PCT No.: PCT/EP2015/002498
§ 371 (c)(1),
(2) Date: Jul. 14, 2017

(87) PCT Pub. No.: WO2016/112940
PCT Pub. Date: Jul. 21, 2016

(65) Prior Publication Data
US 2018/0023659 A1    Jan. 25, 2018

(30) Foreign Application Priority Data

Jan. 17, 2015   (DE) .................... 10 2015 000 524.3

(51) Int. Cl.
*G01C 19/16* (2006.01)
*G01C 19/20* (2006.01)
(Continued)

(52) U.S. Cl.
CPC .............. *F16F 15/30* (2013.01); *B60G 21/08* (2013.01); *F16F 15/02* (2013.01);
(Continued)

(58) Field of Classification Search
CPC ..... B60G 21/08; B60G 2202/22; F16F 15/30; F16F 15/02
See application file for complete search history.

(56) References Cited

U.S. PATENT DOCUMENTS

| 5,628,267 A | * | 5/1997 | Hoshio | ................... B63B 39/04 114/122 |
|---|---|---|---|---|
| 2004/0244513 A1 | | 12/2004 | Adams et al. | |
| 2016/0229256 A1 | * | 8/2016 | Koch | ...................... F16F 15/02 |

FOREIGN PATENT DOCUMENTS

| DE | 102013015702 B3 | 12/2014 |
| EP | 0650890 A1 | 5/1995 |

OTHER PUBLICATIONS

Translation of the International Preliminary Report on Patentability dated Jul. 20, 2017, in connection with corresponding international application No. PCT/EP2015/002498 (6 pgs.).

(Continued)

*Primary Examiner* — Jake Cook
(74) *Attorney, Agent, or Firm* — Maier & Maier

(57) ABSTRACT

A method for controlling a rotation damper operating according to the gyroscopic principle for a motor vehicle, wherein the rotation damper includes a flywheel, which is driven by a drive and rotating about a rotation axis with an angular velocity $\omega_\varphi$, which is cardanically mounted via a first bearing element and via a second bearing element, wherein the flywheel is rotatably mounted on a first bearing element and at a rotation angle $\varphi$, and the first bearing element is rotatably mounted on a second bearing means about a first axis that is oriented orthogonally to the rotation (Continued)

axis of the flywheel, and the second bearing element is rotatably mounted at a second rotational angle ($\psi$).

5 Claims, 1 Drawing Sheet

(51) Int. Cl.
*G01C 19/38* (2006.01)
*F16F 15/30* (2006.01)
*F16F 15/02* (2006.01)
*B60G 21/08* (2006.01)

(52) U.S. Cl.
CPC ...... *B60G 2202/22* (2013.01); *B60G 2202/42* (2013.01); *B60G 2401/28* (2013.01); *B60G 2600/14* (2013.01); *B60G 2600/17* (2013.01)

(56) References Cited

OTHER PUBLICATIONS

Examination Report dated Oct. 26, 2015 of corresponding German Application No. 10 2015 000 524.3; 8 pgs.
International Search Report and Written Opinion dated Mar. 14, 2016 of corresponding Application No. PCT/EP2015/002498; 12 pgs.
International Preliminary Report on Patentability dated Feb. 7, 2017 of corresponding Application No. PCT/EP2015/002498; 19 pgs.

\* cited by examiner

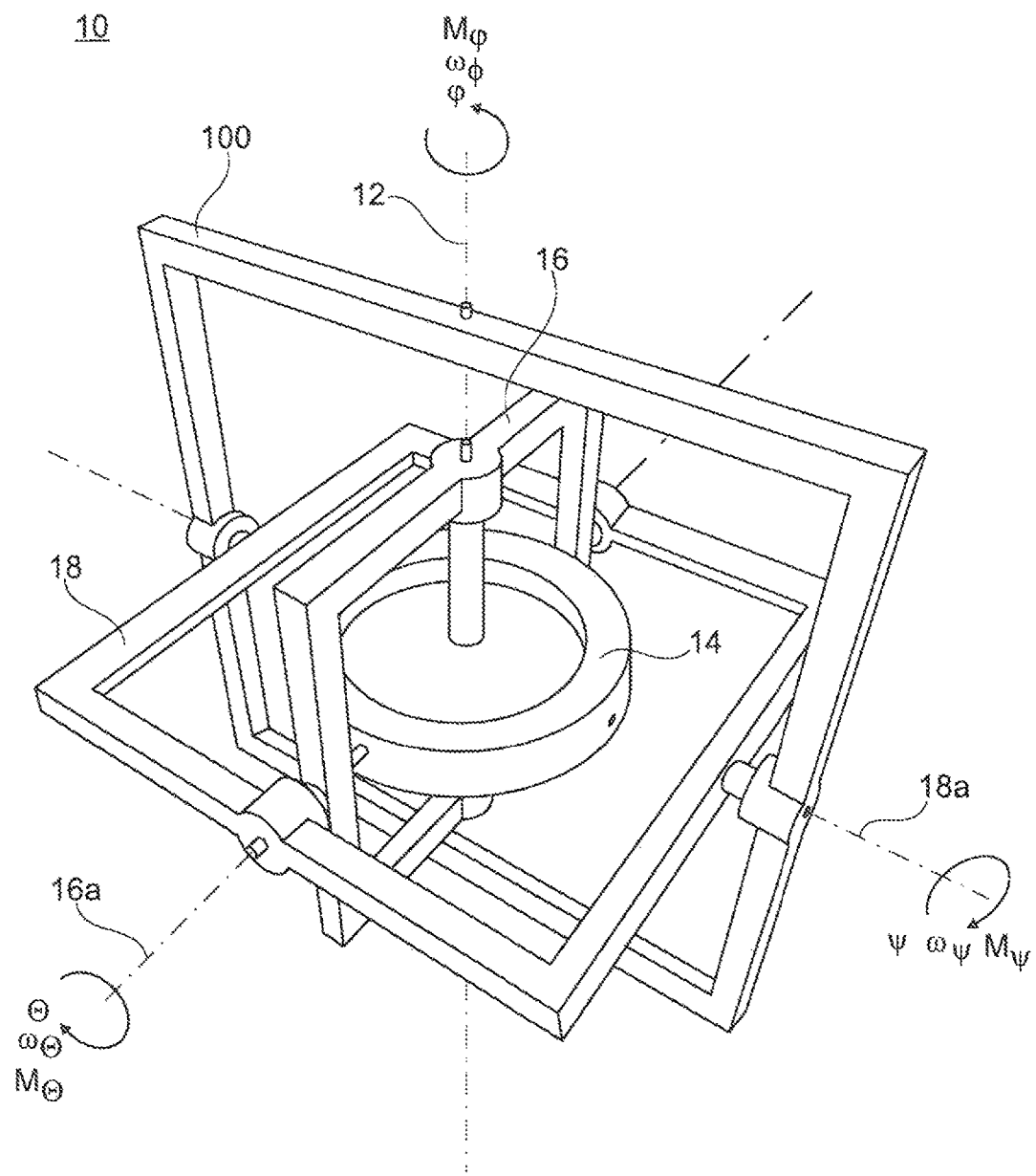

METHOD FOR CONTROLLING A ROTATION DAMPER FUNCTIONING ACCORDING TO THE GYROSCOPIC PRINCIPLE

The invention relates to a method for controlling a rotation damper operating according to the gyroscopic principle for a motor vehicle.

Rotation dampers operating according to the gyroscopic principle represent a new approach to damping of the build-up of the rotations of a motor vehicle. The construction of the rotation damper is in this case designed in such a way that the axis of rotation of a cardanically mounted flywheel is deflected, for example as a result of vertical movement caused by ground irregularities. The resulting precision momentums should/can then be damped only in such a way that a damping effect is created at the wheel carrier. The gyroscopic principle serves in this case as a gear. Depending on the precision moment, the damper can be operated with a very high spread between a minimum and a maximum characteristic curve.

A typical method for controlling a rotation damper of a motor vehicle operating according to the gyroscopic principle, which contains all the features of the preamble of the patent claim 1, is known from DE 10 2013 015 702 B3.

The object of the invention is to provide a method for controlling a rotary damper for a motor vehicle operating according to the gyroscopic principle.

This object is achieved with the features of claim 1.

The dependent claims describe advantageous further developments of the invention.

The rotation damper for a motor vehicle operating according to the gyroscopic principle to be controlled comprises a rotating flywheel driven by a drive about an axis of rotation at the angular velocity $\omega_\varphi$, which is cardanically mounted via a first bearing element and via a second bearing element. In this case, the flywheel is rotatably mounted on the first mounting element at an angle of rotation $\varphi$, and the first bearing element is mounted at a first axis that is orthogonal to the axis of rotation of the flywheel at a rotational angle $\Theta$ on the second bearing means. The second bearing means is rotatably mounted on a second axis, which is oriented orthogonally, at a second rotational angle $\Psi$ on the motor vehicle. Furthermore, the first bearing element is operatively connected to the first a shaft drive and the second bearing element can be operatively connected through a similar means to a wheel carrier, so that an inward/outward movement of the wheel carrier results in the rotation of the second bearing element relative to the motor vehicle assembly at the second rotation angle $\Psi$. In addition, the rotation damper comprises also a control device for controlling the shaft drive that is operationally connected to the first bearing element.

According to the invention, a torque $M_\Psi$ is used as a control variable acting on the second bearing element, and as a manipulated variable is used a torque $M_\Theta$ that can be adjusted via the shaft motor, so that the control of the manipulated variable $M_\Theta$ is carried out as a function of the angle of rotation $\Theta$ and of the angular velocity $\omega_\Theta$, of the first bearing element about the first axis.

The method according to the invention proves to be advantageous because a quick reaction to introduced interferences can be realized as a result of controlling the manipulated variable $M_\Theta$ depending on the rotation angle $\Theta$ and on the angular velocity $\omega_\Theta$.

It is preferred when the control used by the controller is provided with a PD characteristic according to the formula $M_\Theta = c^*\Theta + k^*\omega_\Theta$, wherein c an k are negative in magnitude.

The constants c and k are in this case determined for a soft damper characteristic curve as well as for a hard characteristic curve. Both $|c|>|k|$ as well as $|c|<|k|$ are possible, although $|c|<|k|$ proves to be more practical.

A stochastic change between a hard and a soft characteristic curve with different movement states of the damper is possible. This makes it possible to fulfill the requirements of a skyhook rule algorithm.

The control can be improved when additionally the angle $\psi$ and/or the angular velocity $\omega_\psi$ is/are used. The resulting torques are then as follows:

$$M_\Theta = c^*\Theta + k^*\omega_\Theta + a^*\omega_\psi$$

and $$M_\Theta = c^*\Theta + k^*\omega_\Theta + a^*\omega_\psi + b^*\psi,$$

wherein a<0 and b<0.

A further optimized improvement takes into consideration translational accelerations in the x-, y- and/or z direction. For a small angle $\Theta$, the acceleration can be omitted in the x-direction. For a large angle $\Theta$, the acceleration in the x-direction should be taken into account in the equation above. The same is true also about pitching and rolling, or the acceleration in the y-direction and z-direction. The respective positions of x, y and z are in this case irrelevant.

Other advantages, features and application possibilities will become evident from the following description in conjunction with the embodiment illustrated in the drawing.

The drawing shows the following:

FIG. 1 a schematic illustration of the operation of the rotation damper to be controlled.

FIG. 1 shows a rotation damper, which is overall designated by the reference numeral 10, for a motor vehicle in a schematic illustration.

The rotation damper 10 comprises a flywheel 14 rotating about an axis of rotation 12 with the angular velocity $\omega_\varphi$, which is cardanically mounted via a first bearing element 16 and a second bearing element 18.

In this case, the flywheel 14 is rotatably mounted at the rotational angle $\varphi$ on the first element 16, and the first bearing element 16 is rotatably mounted on the second bearing element 18 at a rotational angle $\Theta$ about an axis of rotation 16a that is oriented orthogonally to the axis of rotation 12 of the flywheel 14, and the second bearing element 18 is mounted about a second axis 18a that is oriented orthogonally to the first axis 16a at a second angle of rotation $\Psi$ rotatably on a motor vehicle assembly 100.

Not shown in the schematic illustration according to FIG. 1 is a drive of the flywheel 14, a shaft drive that is operationally connected to the first bearing element via a drive shaft, and the connection of the second bearing element 18 to a wheel carrier. A representation of the control device is also omitted.

The schematically indicated rotation damper 10 uses the effect of angular inertia in order to initiate the forces in the chassis in a suitable location. These forces are intended to replace the function of a conventional damping element.

The following is a brief explanation of the functional principle.

In the initial state, the flywheel 14 rotates with the angular velocity $\omega_\varphi$, about the rotational axis 12. If a torque $M_\Theta$ is effective on the first axis 16a of the first bearing element 16, a torque $M_\Psi$ is created as a result of the precession about the second axis 18a. The momentums lead to an angular velocity of the first or second bearing element 16, 18. A torque $M_\Theta$ consequently leads to an angular velocity $\omega_\Theta$ of the first bearing 16. This rotation changes the direction of the angular velocity vector $\omega_\varphi$ of the flywheel 14. The flying wheel 14 reacts to such a disturbance with the precession momentum $M_\Psi$ mentioned above. However, since the angular velocity $\omega_\psi$, which is construction dependent, also changes the angular velocity vector $\omega_\varphi$ of the flywheel 14, there is a direct influence on all three axes. The introduction of energy in an axis indicates a change of the energy of both other axes. If the second bearing element 18 is considered as an input, then $M_\Psi$ and $\omega_\psi$ are oriented in the same direction. This energy can be removed again on the first axis 16a of the first bearing element, so that $M_\Theta$ and $\omega_\Theta$ are oriented in opposite directions. The opposite case is also possible. When the components $M_\Theta$ and $\omega_\Theta$ are aligned in the same direction, this leads to unequally oriented amounts of $M_\Psi$ and $\omega_\psi$. If the entire energy of the torque $M_\Theta$ is not removed, then the angular velocity of $\omega_\varphi$ of the flywheel 14 will be increased as a result of the feedback effect. The excess energy is stored in the form of kinetic energy in the rotational movement of the flywheel 14. The transmission ratio of the individual momentums is in this case determined by the inertia levels of the flywheel 14.

If the second bearing element 18 is now connected with a wheel carrier so that an inward/outward movement of the wheel carrier causes a torque $M_\Psi$ and an angular velocity $\omega_\psi$ of the second bearing element 18 about the second axis 18a, a relative movement of the bearing element 16 about the first axis 16a is created. If a counter-momentum $M_\Theta$ to the angular velocity $\omega_\Theta$ of the first bearing element 16 is applied, then the relative movement of the bearing element 16 about the first axis 16 will be damped. This again leads to damping of the angular velocity $\omega_\psi$ of the second bearing element 18 about the second axis 18a. The damping will be stronger or weaker depending on the magnitude of the component of the counter-momentum $M_\Theta$.

In contrast to that, if a momentum $M_\Theta$ is applied that is oriented in the same direction as the angular velocity $\omega_\Theta$, this will support the inward/outward movement. This means that that the rotation damper 10 can be also used as an actuator in order to actively position the vertical forces and thus to assume the functions of an active chassis.

According to the method of this invention, in order to achieve the effects mentioned above, a torque $M_\Psi$ that is acting as a control variable is used on the second bearing element 18, and a torque $M_\Theta$ that can be set via the shaft motor is used as a manipulated variable. In this manner, the control of the manipulated variable is carried out as a function of the angle of rotation $\Theta$ and of the angular velocity $\omega_\Theta$ of the first bearing element 16 that takes place about the first axis 16a.

The invention claimed is:

1. A method for controlling a rotation damper operating according to the gyroscopic principle for a motor vehicle, wherein the rotation damper comprises:

a flywheel driven by a drive, rotating about a rotation axis with an angular velocity $\omega_\varphi$, which is cardanically mounted via a first bearing element and a second bearing element, wherein the flywheel is rotatably mounted at a rotation angle $\varphi$ on the first bearing element, and the first bearing element is rotatably mounted at the second bearing element about a first axis oriented orthogonally to the rotation axis of the flywheel at a first rotation angle $\Theta$, and the second bearing element is rotatably mounted about a second axis oriented orthogonally to the first axis at a second rotation angle $\Psi$, wherein the first bearing element is operationally connected to a shaft drive and the second bearing element is connected to a wheel carrier, so that an inward and outward movement of the wheel carrier causes a rotation of the second bearing element at the second rotation angle $\Psi$, wherein a torque $M_\Psi$ acting on the second bearing element is used as a control variable and an adjustable torque $M_\Theta$ that is set via the shaft motor is used as a manipulated variable, wherein the control of the manipulated variable $M_\Theta$ is carried out as a function of the first rotation angle $\Theta$ and of the angular velocity $\omega_\Theta$ of the first bearing element about the first axis.

2. The method for controlling a rotation damper operating according to the gyroscopic principle according to claim 1, wherein the control of the manipulated variable $M_\Theta$ is carried out with a controller with the PD characteristic according to the equation:

$$M_\Theta = c*\Theta + k*\omega_\Theta, \text{ wherein } c \text{ and } k \text{ are constants and } |c| \text{ and } |k| < 0.$$

3. The method for controlling a rotation damper operating according to the gyroscopic principle according to claim 2, wherein in addition to the control of the manipulated variable $M_\Theta$, the rotation angle $\psi$ and the angular velocity $\omega_\psi$ of the second bearing element are taken into account according to the equation:

$$M_\Theta = c*\Theta + k*\omega_\Theta + a*\omega_\psi, \text{ and/or}$$

$$M_\Theta = c*\Theta + k*\omega_\Theta + a*\omega_\psi + b*\psi,$$

Wherein $|a|$ and $|b| < 0$ or a or b=0.

4. The method for controlling a rotation damper operating according to the gyroscopic principle according to claim 2, wherein along with the control of the manipulated variable $M_\Theta$, a translation acceleration is taken into consideration in the x-, y- and z-direction.

5. The method for controlling a rotation damper operating according to the gyroscopic principle according to claim 2, wherein along with the control of the of the manipulated variable $M_\Theta$, a rotational angle position, angular velocity and angular acceleration in the x-, y- and z-directions of the chassis are taken into consideration relative to the road or street.

* * * * *